Figure 1:
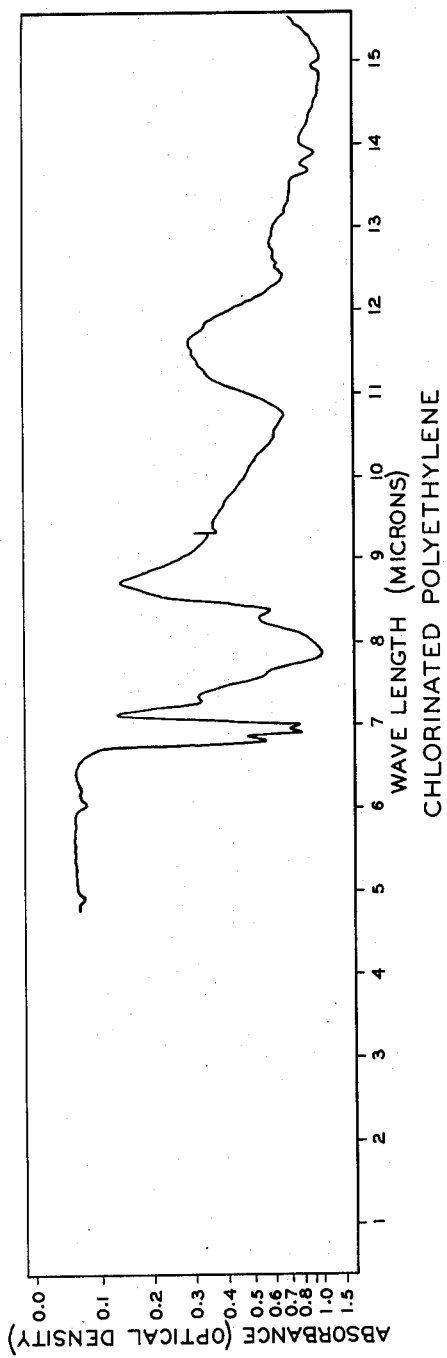

Dec. 7, 1965    C. L. MORRIS, JR., ETAL    3,222,345
PROCESS FOR REDUCING THE INTRINSIC VISCOSITIES
OF CHLORINATED POLYMERS OF $C_2$ TO $C_3$ OLEFINS
Filed July 13, 1961    2 Sheets-Sheet 1

INVENTORS:
CHARLES L. MORRIS, JR.
PAUL W. SIMON
BY
Elizabeth Hunter
ATTORNEY

CHANGE IN INTRINSIC VISCOSITY WITH TIME OF
CHLORINATED POLYETHYLENE OF 55% CHLORINE
CONTENT IN PRESENCE OF $NO_2$ AT 115° C.

FIG.4.   CHLORINATED POLYETHYLENE

INVENTORS:
CHARLES L. MORRIS, JR.
PAUL W. SIMON
BY
*Elizabeth Hunter*
ATTORNEY

United States Patent Office 3,222,345
Patented Dec. 7, 1965

3,222,345
PROCESS FOR REDUCING THE INTRINSIC VISCOSITIES OF CHLORINATED POLYMERS OF $C_2$ TO $C_3$ OLEFINS
Charles L. Morris, Jr., Short Hills, and Paul W. Simon, Basking Ridge, N.J., assignors to Allied Chemical Corporation, New York, N.Y., a corporation of New York
Filed July 13, 1961, Ser. No. 123,751
5 Claims. (Cl. 260—93.7)

This invention relates to a method for reducing the intrinsic viscosities of high molecular weight chlorinated polyolefins, particularly to such method as applied to chlorinated polymers of olefins having from 2 to 3 carbon atoms, and more particularly to such method as applied to resinous chlorinated polyolefins which tend to exhibit poor "processability" when masticated on conventional compounding rolls.

High density chlorinated polyolefins such as those prepared by chlorinating polyethylenes and polypropylenes of average molecular weights between about 1,000,000 and about 5,000,000 have valuable film forming properties, combining unusually high strength characteristics with compatibility with plasticizers and fillers, and thus possess outstanding utility in the manufacture of plastic sheet materials such as floor and wall coverings and the like.

In the preparation of such plastic sheet materials it is customary to fabricate the sheet either by mastication of the resin alone or to blend the resin component (e.g. chlorinated polyethylene) with plasticizer and sometimes with other ingredients on roller mills such as the conventional rubber compounding rolls.

The high molecular weight chlorinated polyethylenes have strength characteristics in terms of tensile strength, significantly superior to those of conventional chlorinated resins such as vinyl chloride polymer and co-polymer resins. It has been found, however, that in the compounding of the high strength chlorinated polyethylene resins with plasticizers and other components, the use of these resins gives rise to difficulties in processing, i.e., to difficulties in extrusion, sheet formation and in blending of the components stemming from their high intrinsic viscosities, the chlorinated polyethylenes exhibiting so-called "nerve" or lack of plasticity, thus requiring longer milling times at higher temperatures than required by conventional polyvinyl chloride resins, to "break the nerve" and to effect adequate sheeting and blending.

A primary object of the present invention is to provide a process for reducing the intrinsic viscosities of high molecular weight resinous chlorinated polymers of olefins having from 2 to 3 carbon atoms.

Another object of the invention is to provide a process for improving the processibility of high molecular weight chlorinated polymers of olefins having from 2 to 3 carbon atoms.

A still further object of the invention is to provide a process for improving the processibility of high molecular weight chlorinated polyethylene resins while preserving their high strength characteristics.

These and other objects are accomplished according to our invention wherein high molecular weight chlorinated polymers of olefins having 2 to 3 carbon atoms, containing up to about 65% chlorine or higher, and having initial intrinsic viscosities of at least about 1.5 are subjected, in finely divided, pulverulent form, to the action of nitrogen dioxide at temperatures between about 100° C. and about 130° C. for a period sufficient to effect a significant reduction in their intrinsic viscosities. This reduction in intrinsic viscosity constitutes a convenient measure of improved processability of the treated polymers.

Figure 2:
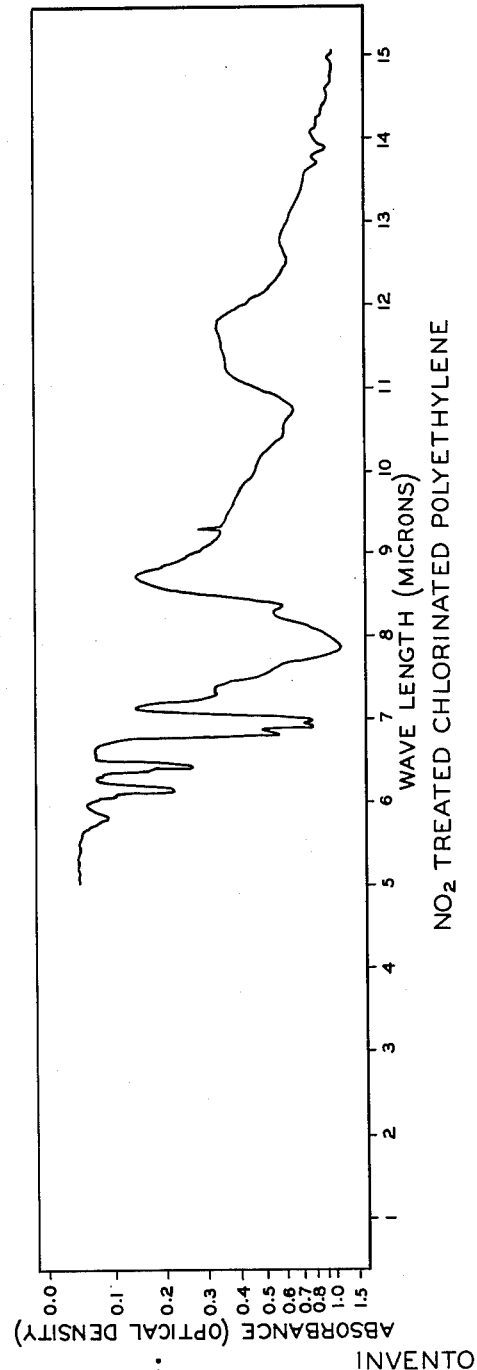
Figure 3:
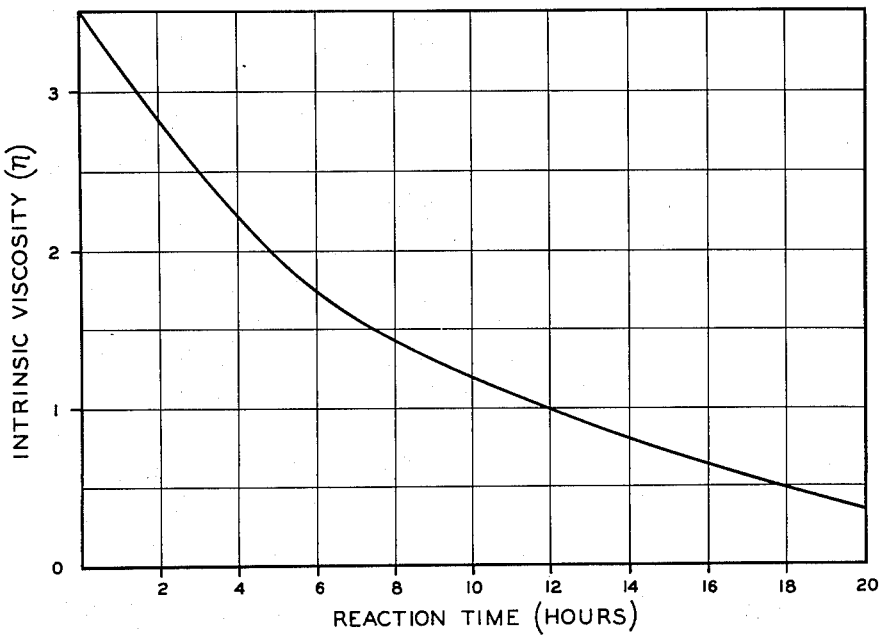
Figure 3:
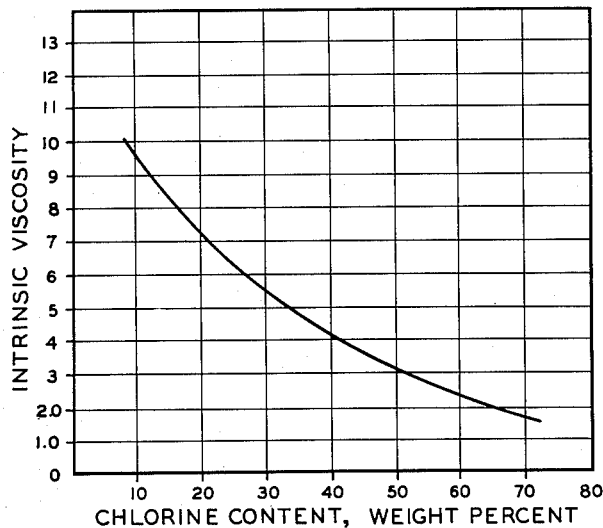

In the drawings, FIGURE 1 illustrates, in the range between 5 microns and 15 microns, the infrared spectrogram of a resinous chlorinated polyethylene of 55% chlorine content and intrinsic viscosity of 4.0. FIGURE 2 illustrates the infrared spectrogram in the same wave length range, of a reduced viscosity chlorinated polyethylene prepared from the chlorinated polyethylene of FIGURE 1, and having an intrinsic viscosity of 1.0. FIGURE 3 is a curve illustrating the progressive reduction in intrinsic viscosity of a typical chlorinated polyethylene with time of treatment with nitrogen dioxide under the conditions of the invention.

FIGURE 4 is a curve showing the intrinsic viscosities of chlorinated polyethylenes of varying chlorine contents.

It will be noted that FIGURE 1 exhibits typical infrared absorption peaks for chlorinated polyethylene at 6.8 to 6.9 microns; at 7.8 to 7.9 microns; at 13.6 and at 13.8 microns. FIGURE 2 exhibits the same absorption peaks as the chlorinated polyethylene of FIGURE 1, and in addition, the reduced viscosity chlorinated polyethylenes of our invention exhibit additional absorption peaks at 5.8–5.9 microns indicative of

groups; at 6.10 microns indicative of C—O—N=O groups; at 6.15 microns indicative of

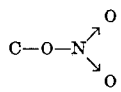

groups and at 6.45 microns indicative of

groups.

FIGURE 3, illustrating the reduction in intrinsic viscosity [$\eta$] with time of $NO_2$ treatment at 115° C. of a 55% chlorine-containing chlorinated polyethylene of initial intrinsic viscosity 4.0, indicates that initial rate of reduction is quite rapid in the first few hours, leveling off after reaching a value of about 0.7.

FIGURE 4 is a graph of intrinsic viscosities of chlorinated polyethylenes of varying chlorine contents, prepared by chlorinating a polyethylene of intrinsic viscosity of about 13 to progressively increasing chlorine contents.

In carrying out the process according to our invention a charge of chlorinated polyolefin, including the chlorosulfonated polymer, in finely divided pulverulent form is placed in a closed vessel provided with gas inlet and outlet lines and preferably equipped for agitation, either by rotation, stirring means or the like, and for temperature control, for example, as by enclosure in a heat tempered chamber. The vessel is heated to the desired reaction temperature and nitrogen dioxide, for example, in gaseous form, is fed into the vessel into contact with the pulverulent chlorinated polyolefin, and is allowed to react therewith for a time sufficient to reduce the intrinsic viscosity of the polymer to the desired value, preferably, in the case of chlorinated polyethylenes, to not more than about 1.5 preferably to between about 0.5 and about 1.0 which values have been found to yield chlorinated polyethylenes of good processability and at the same time having high tensile strengths and high elasticity and elongated.

The characteristic of good "processability," as understood in the rubber and resin fields and which is achieved according to our invention, manifests itself by rapid cohesion and banding of the pulverulent resin when worked on conventional rubber compounding rolls at relatively low temperatures and involves either the exhibition of little or no "nerve" or the rapid removal or breaking of the "nerve" after short milling times, preferably after not more than about 5 minutes of mastication on a 2 roll rubber mill at temperatures between about 100° C. and about 120° C. The so-called "nerve" exhibited by certain rubbers and other resinous materials manifests itself by difficulty in achieving good banding and in the presence of excessive resilience in the resinous sheet, so that when a sheet of the resin which has been formed on a mill is slashed, the slash pulls apart and spreads widely. When little or no "nerve" is present, such a slash does not spread apart and gives rise to a so-called "dead' cut indicating absence of "nerve.' In general, "processability" can be measured in terms of rapidity of banding on the mill, i.e. in the time required for the resin to fuse out into a coherent sheet on the mill at a given temperature. Reduction in intrinsic viscosity of the polymers improves their processability.

Any high molecular weight polymer of a $C_2$ to $C_3$ chlorinated olefin can be used in the process of our invention. Chlorinated polyethylenes prepared from the ultra high molecular weight polyethylenes described in copending applications of Thomas M. Cawthon, Jr., and George G. Joris, Serial No. 597,900, filed July 16, 1956, now U.S. Patent 3,050,514 granted August 21, 1962, and Serial No. 654,602, filed April 23, 1957, now abandoned, are especially adapted for treatment according to our invention. These polyethylenes have average molecular weights between about 1,000,000 and about 5,000,000. They are prepared as described in the above copending applications, by at least intermittently contacting anhydrous, oxygen-free ethylene in gaseous phase with an inorganic, porous, frangible, solid contact catalyst prepared from an inorganic compound of chromium and oxygen and an active metal alkyl as described in said applications. Especially preferred are the polyethylene products prepared as described in application Serial No. 654,602. These polyethylenes have infrared spectrograms exhibiting the characteristic polyethylene absorption peaks as indicated above, they have the empirical formula $(CH_2)_x$ and have average molecular weights, calculated from viscosities in decalin solution at 135° C. by the P. S. Francis et al. formula, in the range between about 1,000,000 and about 5,000,000 and densities in the range between about 0.935 and about 0.985, usually between about 0.935 and about 0.960 at 23° C.

The chlorinated derivatives of the above polyethylenes can be treated according to our invention with especially beneficial results. Such chlorinated, high molecular weight polyethylenes can be prepared as described in copending application of Wilbur F. Chapman and John N. Cosby Serial No. 819,106, filed June 9, 1959, wherein a polyethylene having an average molecular weight between about 1,000,000 and about 5,000,00, and density between about 0.935 and about 0.985, in finely divided powdered form is subjected to the action of gaseous chlorine in the presence of an inert diluent gas, at temperatures between about 40° C. and about 100° C. at a chlorination rate between about 0.5 and about 15.0 parts by weight of chlorine reacted per hour per 100 parts of polyethylene, until the desired chlorine content up to about 66% chlorine has been reached. These chlorinated high molecular weight polyethylenes have intrinsic viscosities as determined in o-dichlorobenzene at 100° C., which may range from about the 13 to 14 value for the unchlorinated material to about 1.8 for a chlorinated polyethylene containing 66% chlorine. Chlorinated polyethylenes of intermediate chlorine contents will have intermediate viscosities as shown in FIGURE 4 of the drawings.

Similarly, high molecular weight chlorinated polypropylenes may be used in the process of our invention. Chlorinated polypropylenes of intrinsic viscosities of at least about 1.5 may be used.

As applied to the high molecular weight chlorinated polyethylenes, the process according to our invention results in a reduction in the intrinsic viscosity of the chlorinated polyethylenes thus treated, from values which are typically between about 3 and about 5 as measured in a 0.1% solution in o-dichlorobenzene at 100° C. according to ASTM method D-1601-59T, to values of not more than about 1.5, preferably between about 0.5 and about 1.0. Such a reduction in intrinsic viscosity appears to be responsible for improved processability, and yet to provide resulting resins having high strength and elasticity characteristics in terms of standard tensile and elongation values, the resulting tensile values being about equal to or higher than those of polyvinyl chloride resins, while their elasticities, i.e. elongation values are generally considerably higher than those of polyvinyl chloride.

For certain purposes, where very soft sheets are desired and wherein strength is of less importance, reduction in viscosity may be carried to even lower extremes to serve the purposes of the intended end uses in the chlorinated polyolefins.

The reduction in intrinsic viscosity thus produced is indicative of a reduction in average molecular weight. While these values are not precisely correlatable, it is estimated that intrinsic viscosities of between about 5.0 and about 0.5 correspond to molecular weights of the order of between about 1,000,000, and about 100,000. Thus the average molecular weights of our preferred treated chlorinated polyethylenes remain above about 100,000, usually between about 100,000 and about 500,000.

Reduction in intrinsic viscosity proceeds as a function of the time of exposure to nitrogen dioxide gas as illustrated in FIGURE 3 of the drawings and may be carried down to the extent desired, although prolongation of time of treatment tends to result in some discoloration of the polymer.

Intrinsic viscosities recorded herein are determined according to ASTM test method D-1601-59T by dissolving 0.1 gram of the polymer in 100 ml. of an appropriate solvent, such as o-dichlorobenzene, and determining the time of flow in seconds of the solution at 100° C., through an orifice .65 mm. in diameter, then comparing this time with the time of flow through the same orifices of a like volume of the pure solvent according to the equation $$\eta i = \frac{\frac{t-t_o}{t_o}}{C}$$

wherein $\eta i$ is the intrinsic viscosity, $t$ is the effluent time (usually in seconds) for a given quantity of polymer solution, $t_o$ is the effluent time for an equal quantity of pure solvent of said polymer solution, and C is the concentration of said polymer solution in grams per 100 cm.³ of solution.

Since $$\frac{\frac{t-t_o}{t_o}}{C}$$

also equals $$\frac{\eta_{sp}}{C}$$

wherein $C=0$ and $\eta_{sp}$ is the specific viscosity, $\eta i$ can be readily determined by plotting $$\frac{\eta_{sp}}{C} \text{ vs. } C$$

and extrapolating to zero concentration.

As brought out above, our process appears to modify the chlorinated polyolefins to add small percentages of ONO, $ONO_2$ groups and $NO_2$ groups as indicated by the peaks in the infrared spectrogram of chlorinated polyethylene at 6.10 microns, 6.15 microns and 6.45 microns as illustrated in FIGURE 2 of the drawings.

Suitable temperatures for carrying out our process lie between about 100° C. and about 130° C., lower temperatures resulting in very little if any reaction whereas higher temperatures tend to cause discoloration of the resin.

Pure nitrogen dioxide may be used as the treating gas if desired, or mixtures thereof with air or an inert gas may be used. Flow rates of $NO_2$ can be as rapid as absorption takes place at the reaction temperature and can suitably be between about 150 and about 500 parts by weight per hour per 100 parts of polymer charged.

The following specific examples further illustrate our invention. Parts are by weight except as otherwise noted.

EXAMPLE 1

A chlorinated high molecular weight polyethylene in finely divided powder form having 52% chlorine and an intrinsic viscosity of 2.5, was placed in a rotatable reactor. The reactor was heated externally to 120° C. and nitrogen dioxide gas was fed into the reactor in a slow stream while rotating the reactor, for a period of 8 hours. The reactor was then purged with nitrogen and the treated product removed. It had an intrinsic viscosity of 0.6. The product was tested for processability by preparing a formulation consisting of

| | Parts |
|---|---|
| Reaction product | 80 |
| Plasticizer (dioctylphthalate) | 20 |
| Stabilizer | 2 |

The mixture was masticated on a 2-roll conventional rubber mill where it exhibited little or no "nerve" and required only 20 pounds of steam pressure on the mill rolls whereas the untreated chlorinated polyethylene, milled in the same formula exhibited considerable "nerve" and required 50 pounds of steam pressure. The product fused and banded rapidly, and had the following properties compared to a similar plasticized blend made with the untreated chlorinated polyethylene.

| | Tensile p.s.i. | Elongation, percent | S-100, p.s.i. | Tear, lbs./in. |
|---|---|---|---|---|
| Reaction product | 1,956 | 383 | 173 | 136 |
| Untreated chlorinated PE | 1,930 | 406 | 236 | 160 |

The above tests illustrate the retention of desirable physical properties in the treated product in spite of the reduction in intrinsic viscosity and improvement in processability.

EXAMPLES 2–10

A series of tests was run in which ten part samples of chlorinated polyethylenes having chlorine contents of 53%, 57% and 60% respectively, intrinsic viscosities of 2.9 to 4.27, were placed in a rotatable reactor. While rotating the reactor, nitrogen dioxide was introduced at rates ranging from about 15 parts to about 50 parts per hour per ten parts of charge. The reactor was heated to reaction temperature over varying periods of time as indicated in Table I below, and allowed to react for the indicated period at the average reaction temperature shown in the table. After completion of the reaction, the still pulverulent products were removed, tested for intrinsic viscosity and percent nitrogen. To test the "processability" of the resulting products, they were compounded on a two roll rubber mill in a composition containing 100 parts reaction product, 35 parts plasticizer (dioctylphthalate) and 2 parts stabilizer, and tested for time required for banding and evaluated as to "nerve". Tests were also run on standard tensile and elongation of the plasticized composition (ASTM–D–638–58T), and also its strength at 100% elongation (S–100). Conditions of the tests and results are shown in Table I below.

Table I

| Example No | 2 | 3 | 4 | 5 | 6 | 7 | 8 | 9 | 10 |
|---|---|---|---|---|---|---|---|---|---|
| Chlorinated PE charge: | | | | | | | | | |
| Intrinsic viscosity | 4.27 | 4.27 | | | | | | | |
| Percent chlorine | 53 | 53 | 57 | 57 | 57 | 57 | 57 | 57 | 60 |
| Reaction: | | | | | | | | | |
| Hrs. heat-up time | 0.5 | 0.5 | 0.5 | 0.5 | 0.5 | 0.25 | 1.0 | 0.7 | 0.75 |
| Starting temp | 112 | 112 | 111 | 112 | 115 | 112 | 113 | 113 | 115 |
| Reaction time, hrs | 8 | 8 | 5.5 | 6 | 7.5 | 8 | 9.0 | 9.3 | 9.0 |
| Average temp | 115 | 115 | 115 | 115 | 115 | 115 | 115 | 115 | 116 |
| $NO_2$ flow rate, g./hr | | | 28.3 | 16.6 | 47.0 | 15.4 | 40.8 | 35.7 | |
| Product properties: | | | | | | | | | |
| Intrinsic viscosity | 1.70 | 1.02 | 1.10 | 1.17 | 0.50 | 0.73 | 0.73 | 0.50 | 0.50 |
| Wt. percent nitrogen | 0.3 | 0.4 | 0.38 | 0.48 | 0.55 | 0.35 | 0.55 | 0.62 | |
| Tensile (unplasticized) | 5,940 | | | | | | | | |
| Plasticized product: | | | | | | | | | |
| Band time, min | ¼ | ½ | <½ | <½ | <½ | <½ | | <½ | 1.35 |
| Nerve, 1 | Heavy | Slight | None | None | None | None | None | None | |
| UE, percent | 360 | 340 | 292 | 300 | 275 | 275 | 300 | 312 | 270 |
| Tensile, p.s.i. | 2,620 | 1,940 | 2,030 | 2,510 | 1,580 | 1,550 | 1,520 | 1,060 | 2,910 |
| S-100, p.s.i. | 340 | 379 | 345 | 428 | 333 | 308 | 234 | 212 | 97 |

EXAMPLE 11

800 parts of a solid, pulverulent chlorinated polypropylene containing 40% chlorine and having an initial intrinsic viscosity of 1.5 (molecular weight 530,000), was subjected to nitrogen dioxide treatment for 10 hours at 110° C. The resulting product was tacky at room temperature indicating substantial drop in intrinsic viscosity to around a few tenths or less.

EXAMPLES 12–13

Two chlorosulfonated polyethylenes of different chlorine contents were contacted with nitrogen dioxide for 8 hours at 100° C. with reduction of intrinsic viscosity and good retention of strength characteristics, as shown in Table II below in comparison with a commercial chlorosulfonated polyethylene "Hypalon".

Table II

| Example No | 14 | 15 | Commercial Material "Hypalon" |
|---|---|---|---|
| Chlorine, percent | 24.9 | 17.3 | 26–29 |
| Sulfur, percent | 2.5 | 2.8 | 1.3–1.7 |
| Treatment | $NO_2$ | $NO_2$ | ([1]) |
| Product properties: | | | |
| Tensile (p.s.i.) | 140 | 335 | 200–415 |
| Elongation (percent) | 921 | 1,707 | 1,975–3,460 |
| S-100 (p.s.i.) | 751 | 1,283 | 335–1,735 |

[1] "As is," not treated.

EXAMPLE 14

To illustrate the effect of time of treatment with $NO_2$, on the progression of intrinsic viscosity reduction, 700 parts of a powdered chlorinated polyethylene of 55% chlorine content having an intrinsic viscosity of 4.2, was contacted with nitrogen dioxide gas at 115° C. for a total of 20 hours. Samples of still pulverulent product were taken at hourly intervals and tested for intrinsic viscosity, with results shown in Table III below.

Table III

| After hours: | $[\eta]$ |
|---|---|
| 0 | 4.2 |
| 1 | 3.52 |
| 2 | 2.69 |
| 3 | 1.88 |
| 4 | 1.74 |
| 5 | 1.38 |
| 6 | 0.94 |
| 7 | 0.93 |
| 8 | 0.91 |
| 9 | 0.61 |
| 10 | 0.36 |
| 11 | 0.30 |

The process of our invention provides a means for preparing a chlorinated $C_2$–$C_3$ olefin polymer of any desired intrinsic viscosity, i.e. average molecular weight, below that of the starting material by the controlled reduction of viscosity of the ultra high molecular weight chlorinated polymers, so that such molecular weights and intrinsic viscosities may be regulated with ease to produce the particular molecular weight product desired.

The reduced viscosity chlorinated polyethylenes of our invention are of outstanding value in providing resins of excellent processability, short milling times at low temperatures and provide resins in which plasticizer proportions can be markedly reduced due to the softness and pliability of the resin itself, thus obviating eventual embrittlement with progressive volatilization of conventional plasticizer. The resulting tensile strengths of our preferred reduced viscosity chlorinated polyethylene resins containing between about 45% and about 65% chlorine and intrinsic viscosities between about .5 and about 1.5, have unplasticized tensile strengths of at least about 4,000, often as high as 6,000. When formulated with about ⅓ their weights of plasticizer, the preferred chlorinated polyethylene resins of our invention have tensiles of at least about 1,500 and up to about 3,000 or higher and elongations of at least about 225%, usually above about 300%, as compared to typical tensiles of about 2,500 and elongations about 250 in the case of similarly plasticized polyvinyl chloride.

While the above describes the preferred embodiments of our invention, it will be understood that departures may be made therefrom within the scope of the specification and claims.

We claim:

1. The method for improving the processability, while substantially preserving the strength characteristics, of a high molecular weight plastic polymer selected from the group consisting of chlorinated polyethylene and chlorinated polypropylene having intrinsic viscosities of at least about 1.5, which comprises subjecting said polymer in solid, pulverulent form to the action of a gas essentially consisting of nitrogen dioxide, at a temperature between about 100° C. and about 130° C. for a time sufficient to reduce its intrinsic viscosity to a value not below about 0.5.

2. The process according to claim 1, wherein the polymer is a chlorinated polyethylene having an intrinsic viscosity of at least about 1.8 and to introduce at least about 0.3% nitrogen into the polymer.

3. The process according to claim 1, wherein the polymer is a chlorinated polypropylene having an intrinsic viscosity of at least about 1.5.

4. The process for reducing the intrinsic viscosity of chlorinated polyethylenes having chlorine contents between about 45% and about 65%, and intrinsic viscosities as measured in a 0.1% solution of o-dichlorobenzene at 100° C., of at least about 1.8, which comprises subjecting said chlorinated polyethylene in solid pulverulent form to the action of nitrogen dioxide gas, at temperatures between about 100° C. and about 130° C. for a time sufficient to reduce the intrinsic viscosity of the chlorinated polyethylene to not more than about 1.5.

5. The process for reducing the intrinsic viscosity of chlorinated polyethylenes having chlorine contents between about 45% and about 65%, and intrinsic viscosities as measured in a 0.1% solution of o-dichlorobenzene at 100° C., of at least about 1.8, which comprises subjecting said chlorinated polyethylene in solid pulverulent form to the action of nitrogen dioxide gas, at temperatures between about 100° C. and about 130° C. for a time sufficient to reduce the intrinsic viscosity of the chlorinated polyethylene to between about 0.5 and about 1.5.

References Cited by the Examiner

UNITED STATES PATENTS

| 2,461,966 | 2/1949 | Davis | 260—94.9 |
| 2,838,477 | 6/1958 | Roelen | 260—94.9 |
| 2,868,772 | 1/1959 | Ray et al. | 269—94.9 |
| 3,035,038 | 5/1962 | Nolte et al. | 260—94.9 |

FOREIGN PATENTS 476,476   8/1951   Canada.

OTHER REFERENCES

The Condensed Chem. Dictionary, Reinhold, 6th Edition, 1961, page 804 only.

JOSEPH L. SCHOFER, *Primary Examiner.*

M. LIEBMAN, *Examiner.*